Figure 1:
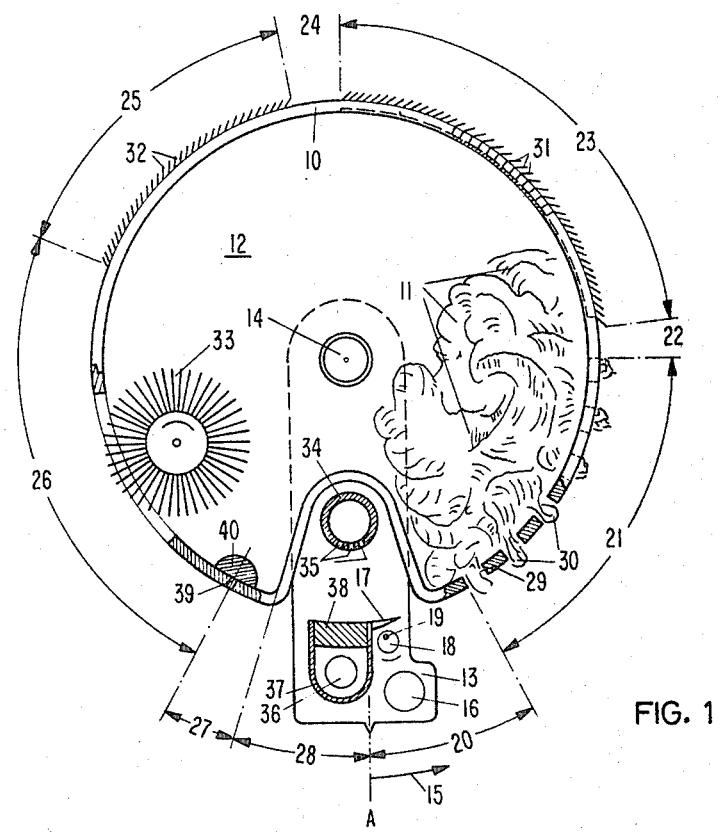

United States Patent [19]

Schwarz

[11] 4,225,244
[45] Sep. 30, 1980

[54] DEVICE FOR INDICATING FIBRE LENGTH DISTRIBUTION OF A FIBRE SAMPLE

[75] Inventor: Eric Schwarz, Kilchberg, Switzerland

[73] Assignee: Matix AG, Zug, Switzerland

[21] Appl. No.: 899,883

[22] Filed: Apr. 25, 1978

[30] Foreign Application Priority Data

Apr. 28, 1977 [AT] Austria ............................... 3013/77

[51] Int. Cl.² .................... G01N 21/00; G01B 11/00; G01N 21/84; D01B 3/04
[52] U.S. Cl. .................................. 356/434; 356/398; 356/429; 19/65 R; 19/115 R
[58] Field of Search ............... 356/432, 433, 434, 398, 356/383, 429, 238; 19/65 R, 115 R; 250/560, 571

[56] References Cited

U.S. PATENT DOCUMENTS 3,577,598  5/1971  Schwarz ............................ 356/398 X Primary Examiner—Vincent P. McGraw
Assistant Examiner—Rodney B. Bovernick
Attorney, Agent, or Firm—Cushman, Darby & Cushman

[57] ABSTRACT

A device for indicating the fibre length distribution of a fibre sample for use with an apparatus which produces output signals representative of the number of fibres in a cross section of a fibre sample by slit-wise illumination of the sample, has a pulse generator to produce a pulse stream representative of the relative positions of the sample and illuminating beam, comparators to compare signals received by opto-electric converter with reference signals to stop counters driven by the pulse stream when predetermined values of the received signals are reached and an indicator for the contents of the counters. The reference signals are derived from the received light signals at predetermined relative positions of the sample and beams.

8 Claims, 4 Drawing Figures

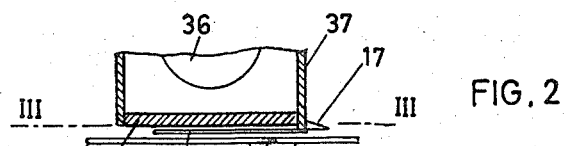
FIG. 2
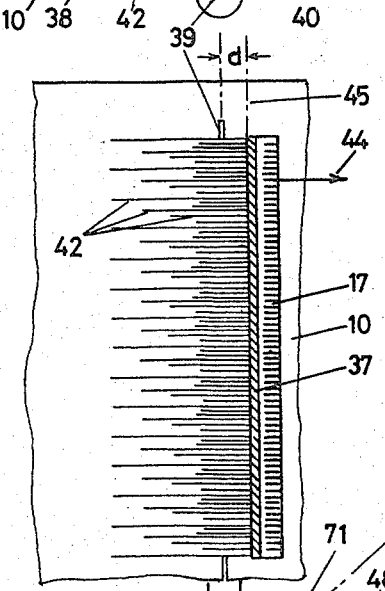
FIG. 3
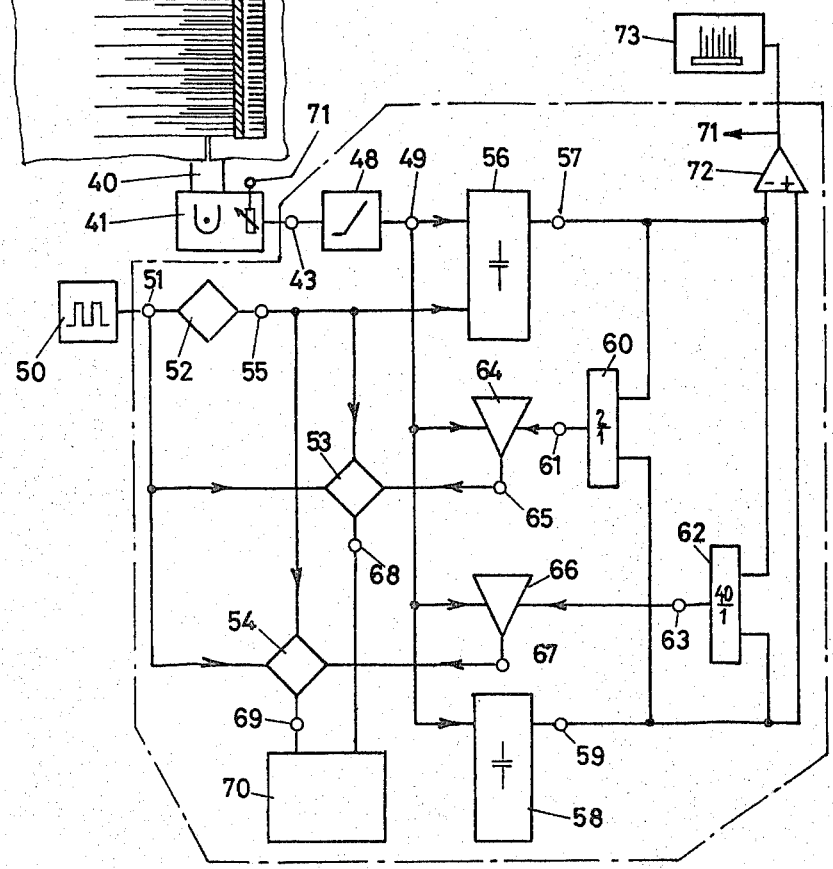

DEVICE FOR INDICATING FIBRE LENGTH DISTRIBUTION OF A FIBRE SAMPLE

The present invention relates to a device for indicating the fibre length distribution of a fibre sample.

An automatically operating apparatus for the production and testing of a fibre sample has already been disclosed and described, for example, in U.S. Pat. No. 3,577,598.

In the previous customary testing instruments for the determination of fibre length distribution, the fibre sample was prepared in a comb, separate from the actual testing instrument, and was then mounted, together with the comb, on a movable comb carrier of the testing instrument and tested. The abovementioned automatically operating apparatus represented substantial progress since, in each revolution, a fibre sample is automatically produced and prepared for testing, the fibre length distribution is determined and the fibre sample is removed, whereupon a new revolution starts. The fibre length distribution is determined by taking the proportion of the quantity of light which is absorbed by the fibre sample as an indication of the number of fibres at the corresponding point of the fibre sample. This number of fibres is recorded as a function of the advance motion of the comb carrier and enables the fibre length distribution in the fibre sample concerned to be determined by a graphical method which is part of the state of the art or by an instrument indication (see MELLIANDTEXTILBERICHTE 6/1964, page 603 to 608).

Although this known automatic apparatus has been quite satisfactory, the indication obtained thereby in practice in textile mills and the fact that it is occasionally necessary to regulate the zero value (no fibres in the light path) and of the so-called "100%" value (maximum absorption by the fibre sample close to the point where it is clamped in the comb) which with incorrect operation can lead to false measurements, have been regarded as troublesome.

According to the present invention, there is provided a measurement device for use with an apparatus for the automatic production and testing of a fibre sample arranged along a comb and consisting of a fibre material which is to be examined, in which apparatus the prepared fibre sample suspended in the comb runs through a testing array comprising a light beam for the slit-wise transverse illumination of the fibre sample and a light receiver for the determination, as an electric light value signal, of the quantity of light transmitted through the fibre sample and an indicator device for indicating the relative position of the sample and light beam in order to determine the fibre length distribution, the device comprising a generator for generating electric pulses indicative of the relative position of the sample and beam, a first, second and third counter means associated therewith the provide respective signals indicative of particular relative positions of the sample and light beam, the first counter means having associated with and being arranged to control storage means arranged to store a first, "100% light value" reference signal arising at an initial relative position of the sample and beam, a first signal divider for forming a second reference signal representative of a predetermined fraction of the stored "100% light value" reference, a comparator for comparing the received light value signals with the second reference signal to generate a stop signal for the second counter means, a second signal divider for forming a third reference signal representative of a further predetermined fraction, smaller than the first mentioned fraction, of the stored "100% light value" reference signal, a further comparator for comparing the light value signals received with the third reference signal to generate a stop signal for the third counter means and a device for indicating the counts stored in the second and third counter means when stopped.

Figure 4:
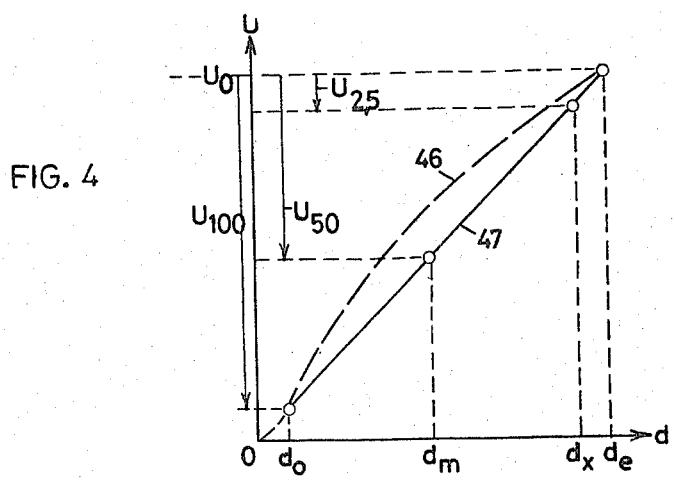

An embodiment of the present invention will now be described by way of example with reference to the accompanying drawings, in which:

FIG. 1 is a plan in diagrammatic representation, partially in section, of an illustrative form of an automatic apparatus of known design for the production and testing of a fibre sample, FIG. 2 shows the elevation, drawn in section, of the optical testing array for the fibre sample in the apparatus of FIG. 1, FIG. 3 is a plan of the optical testing array of FIG. 2 along the section plane III—III and a block diagram of an embodiment of the present invention, and FIG. 4 shows a schematic diagram of the light value signals U as a function of the distance d of the fibre sample from the line-type light beam.

The form of apparatus shown in FIG. 1 corresponds in its mechanical design to that of the abovementioned British patent specification but, for the sake of comprehensibility, it will be briefly described below. In use, a drum 10 is partially filled with a bale 11 of the fibre material which is to be tested, that is to say, for example, with a cotton bale. A swivel arm 13, rotatable about an axis 14, is mounted in the bottom part 12 of the drum 10 in such a way that, by using the handle 16 or alternatively by means of a motor drive, it can be swivelled in the direction of the arrow 15, starting from the initial position A, around the drum 10. A comb 17 which serves to prepare the fibre sample is mounted on the swivel arm 13. A clamping device for the fibres which have been combed out is provided on the swivel arm 13 close to the comb 17; this clamping device consists, for example, of the cylindrical roll 18 which can be twisted eccentrically about a longitudinal axis 19 which in turn is rigidly mounted on the swivel arm 13.

When this swivel arm 13 is moved from the initial position A in the direction of arrow 15, the comb 17 successively passes over the angular zones 20, 21, 22, 23, 24, 25, 26, 27 and 28 of the shell of the drum and then reaches the initial position A again. In the zone 21, the shell of the drum is provided with a multiplicity of passage holes 29, through which fibre tufts 30 protrude from the fibre bale 11 in the interior of the drum. A multiplicity of individual fibres are combed out of these fibre tufts 30 by the teeth of the comb 17 and these are caught between the teeth of this comb 17. When passing through the zone 22, the clamping roller 18 is turned in the direction indicated by the arrow by a suitably shaped control element fixed to the shell of the drum, that is to say it presses from above onto the rear end of the teeth of the comb 17 and thus firmly clamps the fibre ends suspended between the teeth. During the further swivelling motion, which now follows, of the swivel arm 13, the clamping roller 18 remains in this position so that the fibres which have been combed out, or at least the major part thereof, remain suspended in the comb.

In the angle 23, the comb 17 together with the fibre sample suspended thereon moves past a multiplicity of cards 31 which effect, in a known manner, an alignment of the fibres which are suspended in the comb 17 and extend backwards relative to the direction 15 of rotation, and at the same time fibres which are not securely clamped in, fibre knots and impurities are combed out of the fibre sample by the cards. Further means serving to prepare the fibre sample can be located at the zone 24. In the zone 25, cards 32 are again provided which have the effect of further combing-out and alignment of the individual fibres in the fibre sample.

The zone 26 adjoining this can serve for the arrangement of further processing stations for the fibre sample, say a brush 33 rotating in the arrowed direction.

The optical/electrical testing of the fibre sample which has been produced and prepared in the manner described, takes place on passing through the zone 27, and this procedure is explained in further detail below. Finally, the swivel arm 13 reaches again the initial position A via the angle zone 28. During this part of the swivel motion, the clamping roller 18 is turned again into the illustrated position, the fibres clamped in between the teeth of the comb 17 are thus released and simultaneously air is fed in via the pipe 34, which air provides, via the nozzle-like bores 35, an air stream moving radially outwards and in the direction of the comb 17, in order to blow away the fibres which are suspended in the comb. Thus, removal of the fibre sample suspended on the comb 17 is effected by blowing away in this manner, until the swivel arm 13 reaches its initial position A, and from the latter the cycle just described can immediately start anew, that is to say a new fibre sample can be automatically produced and tested.

In the illustrated apparatus, the determination of the fibre length distribution takes place in such a way that an elongate light source 36 and a transuluscent plate 38 which serves as support for the fibre sample 42 being formed on the comb 17, are located in a housing 37 on the swivel arm 13, directly at the root of the comb 17. In a known manner, provision is made for a largely constant luminance on the exit side of the luminant plate 38 so that the light flux incident on each point of the fibre sample suspended on the comb 17 is of the same magnitude. As soon as the swivel arm enters the zone 27, the illuminated plate 38 with the fibre sample 42 resting thereon passes over the slot 39 which is provided in the shell of the drum, parallel to the axis 14 and behind which a light conductor 40 is placed. This light conductor 40 is connected to a receiver element 41 which converts the quantity of light passing through the slot 39 into a proportional electrical signal U at the output 43. When the fibre sample 42 suspended on the comb 17 runs past the slot 39 in the direction of the arrow 44, a quantity of light, depending on the attenuation of the light by the fibre sample 42 in the particular position, passes into the light conductor 40. The electrical signal U emitted by the receiver element 41 at the output 43 is thus directly proportional to the quantity of light transmitted by the fibre sample in the particular position of the arm 13.

The indicating device carries out automatic electronic processing of the signal U generated at the output 43 enabling the data essential for assessing the fibre length distribution in the fibre sample 42 to be indicated numerically as a function of the position of the fibre sample 42 relative to the slot 39, it no longer being necessary to adjust zero values or extreme values, as is explained further below.

If the leading edge of the fibre sample 42 resting on the plate 38 is designated as 45 (FIG. 3) and the particular distance between this edge 45 and the slot 39 is designated as d, the signal U arising at the output 43, when the fibre sample 42 runs past the slot 39, is a logarithmic function of the distance d; this can be proved empirically. The logarithmic variation of the signal U at the output 43 as a function of the distance d corresponds, for example, to the curve 46 in FIG. 4. The course of the signal U must be rendered linear corresponding to the straight line 47, and for this purpose a device 48 of known design is provided. Signals which are called "light value signals" in the following text and which are proportional to the distance d, then arise at the output 49 thereof.

It should be pointed out that the fibre sample 42 is only schematically indicated in FIG. 3 and, in particular, extends beyond the ends of the slot 39 on either side, that is to say that it completely covers the latter, so that only the quantity of light transmitted by the fibre sample 42 passes via the light conductor 40 into the receiver element 41.

As indicated schematically in FIG. 4 by curve 47, the light value signals arising at the output 49 are proportional to the distance d between the inlet edge 45 of the fibre sample and the slot 39 which defines the scanning line-type beam of light. Proportionality exists at least in the range of the distances $d_o$ to $d_e$, which are defined more accurately further below. In the present apparatus, the particular position of the fibre sample relative to the beam of light, that is to say the distance d, is marked by electrical pulses of the generator 50 and by corresponding counter elements. For example, the pulse generator 50 is switched on by the first light value signal arising at the connection 49, that is to say as soon as the inlet edge 45 of the fibre sample passes over the slot 39. The strict proportionality of the pulse train, produced by the pulse generator 50 at the connection 51, to the distance d is ensured as a result of generating successive short-period pulses in a known optical/electrical manner during the passage through the zone 27 of the rotating swivel arm 13 which carries the comb 17, for example by means of a slotted disc on the axis of rotation 14 (FIG. 1). If, as mentioned above, a motor drive is provided for the swivel arm 13, so that the latter passes through the angle zone 27 at a predetermined constant angular velocity, it is also possible to provide a pulse generator 50 which operates electronically and which has a constant pulse frequency. Of course, the pulse generator 50 can also be switched on by means of a switch which is mechanically actuated by the swivel arm 13. It is only necessary to ensure that the pulse train at the connection 51 starts at a precisely predetermined angular position of the swivel arm 13 and that the particular distance d between the inlet edge 45 of the fibre sample 42 and the slot 39 can be determined by counting the successive pulses. In practice, a pulse generator has proved successful, which delivers a pulse frequency of 50 Hz and defines a distance of d = 10 degrees of angle by counting 100 pulses each time.

The electrical pulses which arise at the connection 51 and represent the distance d (FIG. 3), pass to the three counter elements 52, 53 and 54, of which, however, only the first counter element 52 starts counting at the first pulse arising at the connection 51, whilst the second and third counter elements 53 and 54 respectively are initially blocked, that is to say remain in their initial states. After a predetermined fixed number of pulses, that is to say as soon as the inlet edge 45 of the fibre sample 42 has reached a certain initial position $d_o$ after the slot 39, the first counter element 52 delivers a start signal to the connection 55. This start signal releases the second and third counter elements 53 and 54 respectively, which now begin to count the further pulses arising, with the initial position of the inlet edge 45 as the starting point. Furthermore, the start signal passes from the connection 55 to a storage element 56 which serves to store the light value signal which arises at the connection at the time of the start signal, that is to say in the initial position $d_o$ of the fibre sample 42, and which is designated as "100%". This 100% light value signal is then available unchanged at the connection 57 of the storage element even once the fibre sample 42 moves on from this initial position $d_o$. The 100% light value signal is intended to represent that quantity of light which is transmitted by the fibre sample 42 in the initial position $d_o$, the number of fibres present here being regarded as 100% of the total quantity of fibres present in the sample. The short fibres which may be present between the inlet edge 45 and the initial position of the fibre sample, defined by the counter 52 and the start signal at the connection 55, are thus excluded from the subsequent measurement of the fibre length distribution, which starts after the initial position $d_o$. In practice, a distance of $d_o = 3.8$ mm between the inlet edge 45 and the initial position corresponding to the 100% light value signal has proved suitable, but it can also be fixed to smaller or larger values by a suitable adjustment of the first counter element 52.

The 100% light value reference signal is offset by a voltage $U_{100}$ as compared with a reference voltage $U_o$ which may be designated as a zero value signal. This zero value signal $U_o$ corresponds to the light value signal arising at the connection 49 when there are no absorbing fibres on the luminant plate 38 running past the slot 39. The zero value signal $U_o$ is determined, for example, during a first revolution of the swivel arm 13 (FIG. 1), when there is no fibre sample suspended in the comb 17, and is stored in a second storage element 58. The zero value signal $U_o$ at the connection 59 of the second storage element 58 is available unchanged even when, during the immediately following revolutions of the swivel arm 13, a fibre sample is produced and tested each time. Of course, a suitable design of the comb 17 and the plate 38 could also have the result that, each time immediately before the inlet edge 45 passes over the slot 39, a zero value signal is generated without fibres between the luminant plate 38 and the slot 39 and is stored in the second storage element 58 during the immediately succeeding testing of the particular fibre sample. In any case, the zero value signal which is stored and is available at the connection 59, as a reference voltate $U_o$ of the 100% light value signal, ensures that any changes in the optical/electrical testing device, such as ageing of the light source 36, voltage fluctuations, dust depositions, turbidity phenomena and the like, cannot adversely affect the measured result in the determination of the fibre length distribution in the fibre samples.

The 100% light value signal present at the connection 57 and the zero value signal at the connection 59 are each fed to a first divider 60 and a second divider 62. The first divider 60 emits a 50% light reference value signal at the connection 61, that is to say it effects a sub-division in a ratio of 2:1. The second divider 62 effects a sub-division in a ratio of 40:1, that is to say it emits a 2.5% light value reference signal at its connection 63. These signals are designated in FIG. 4 as $U_{50}$ and $U_{2.5}$ respectively.

A first comparator device 64 compares the 50% light value signal available at the connection 61 with the light value signals which, during the motion of the fibre sample 42, arise at the connection 49 and increase proportionally until equality is reached which leads to a signal at the connection 65. This signal at the connection 65 passes to the second counter element 53 which was switched on beforehand by the start signal at the connection 55 and serves as a stop signal at that point, so that the counter element 53 produces a pulse count which corresponds to the distance of the inlet edge 45 ($d_m$ in FIG. 4) from the slot 39 when the 50% light value signal arises at the connection 49.

The 2.5% light value signal present at the connection 63 is applied to a second comparator device 66 which emits a signal at its connection 67 whenever a light value signal of equal value arises at the connection 49 during the motion of the fibre sample 42. This signal at the connection 67 is used as a stop signal for the third counter element 54 which had been switched on by the start signal arising at the connection 55 during the passage of swivel arm 13 through the initial position. Thus, the state of the third counter element 54 corresponds to the distance of the inlet edge 45 ($d_x$ in FIG. 4) from the slot 39 at which a 2.5% light value signal appears at the connection 49.

In their simplest forms the second and third counter element 53 and 54 can be suitable step-by-step mechanisms which are moved on by one step in each case by the arriving pulses and which indicate, for example, the distances $d_m$ and $d_x$. However, it is also possible to use electronic counter elements 53, 54 and to effect, by means of the signals arising at the output 68 and 69 thereof, the control of a binary coded decimal electronic numerical display device 70.

After it has completely passed through the zone 27 (FIG. 1), the fibre sample suspended in the comb 17 is removed, as described above. At the same time, an electric resetting pulse is triggered which switches off the pulse generator 50, resets the counter elements 52, 53, 54 into their initial position and discharges the storage element 56. If desired, the storage element 58 can also be discharged, or a new zero value signal can be generated at $d_e$, when the last part of the luminant plate 38 moves past the slot 39, and this can be stored in the storage element 58 as a reference signal for the next testing cycle.

An electronic comparator circuit 72 continuously monitors the 100% light value signal $U_{100}$, present at the connection 57, relative to the zero value signal $U_o$ at the connection 59. The comparator circuit 72, the output of which is connected via the terminal 71 to the receiver element 41 for the quantity of light transmitted by the fibre sample 42, regulates the sensitivity of this receiver element 41 in such a way that a constant 100% light value signal $U_{100}$ arises within certain limits. The monitoring signalling device 73, which is likewise connected to the output of the comparator circuit 72, indicates, in the case of an excessive deviation of the 100% light value reference signal $U_{100}$, that the amount of fibres in the fibre sample 42 is too low or too high, the measuring process being interrupted simultaneously. In this way, faulty measurements as the result of excessively thick or thin fibre samples 42 can be avoided, and this has proved to be important in practice.

The abovementioned linearisation of the light value signals U as a function of the distance d, which must be ensured at least between the values $d_o$ and $d_e$ in FIG. 4, can be effected with the aid of suitable electronic circuits in the component 48. For example, a network of resistors and diodes or transistors, or an amplifier arrangement having negative feedback and a non-linear characteristic can be used. It is also possible in the device 48 to convert the signal, coming from the connection 43, in an analog/digital converter into a pulse train, to render the latter linear in a correspondingly programmed computer and, if desired, to reconvert it into an analog signal at the output 49.

It should also be pointed out that at least the part of the circuit surrounded in FIG. 3 by a dash-and-dotted line, can also be realised by an electronic process computer of known design or a microprocessor, which is programmed in such a way that it carries out the functions of this part of the circuit in accordance with the above description and supplies an indication of the fibre length distribution which is to be determined. If desired, the indication can also be printed out by means of known printing devices and can thus be provided simultaneously with data about the particular material samples tested.

I claim:

1. A measurement device for use with an apparatus for the automatic production and testing of a fibre sample arranged along a comb and consisting of a fibre material which is to be examined, in which apparatus the prepared fibre sample suspended in the comb runs through a testing array comprising a light beam for the slit-wise transverse illumination of the fibre sample and a light receiver for the determination, as an electric light value signal, of the quantity of light transmitted through the fibre sample and an indicator device for indicating the relative position of the sample and light beam in order to determine the fibre length distribution, the device comprising a generator for generating electric pulses indicative of the relative position of the sample and beam, a first, second and third counter means associated therewith to provide respective signals indicative of particular relative positions of the sample and light beam, the first counter means having associated with and being arranged to control storage means arranged to store a first, "100% light value" reference signal which is the difference between a zero value signal and the signal arising at an initial relative position of the sample and beam, a first signal divider for forming a second reference signal representative of a predetermined fraction of the stored "100% light value" reference and a comparator for comparing the received light value signals with the second reference signal to generate a stop signal for the second counter means, a second signal divider for forming a third reference signal representative of a further predetermined fraction, smaller than the first mentioned fraction, of the stored "100% light value" reference signal, a further comparator for comparing the light value signals received with the third reference signal to generate a stop signal for the third counter means, and a device for indicating the counts stored in the second and third counter means when stopped.

2. A device according to claim 1, wherein the storage means is arranged to store a signal representative of a "zero value" reference signal and the arrangement is such that said light value reference signals are referred to the "zero value" reference signal.

3. A device according to claim 2, and including means for comparing the "100% light value" reference signal with "zero value" reference signal and for emitting a control signal which is proportional to the difference thereof.

4. A device according to claim 3, and including means for adjusting the sensitivity of the receiver element to the quantity of light transmitted through the fibre sample and by a circuit for influencing this control instrument by means of the control signal.

5. Evaluation instrument according to claim 4, and including an indicator device for indicating the value of the control signal, to indicate the density of the fibre sample.

6. A device according to claim 5, and including a monitoring signalling device to indicate the occurence of an excessively high or low density of the fibre sample.

7. A device according to any one of the preceding claims wherein the first mentioned and further fractions of the "100% light value" reference signal are substantially ½ for a "50% light value" signal and 1/40 for a "2.5% light value" signal, respectively.

8. A device according to claim 1, wherein the indicating device is a digital display.